United States Patent [19]
Bahl et al.

[11] Patent Number: 4,741,036
[45] Date of Patent: Apr. 26, 1988

[54] DETERMINATION OF PHONE WEIGHTS FOR MARKOV MODELS IN A SPEECH RECOGNITION SYSTEM

[75] Inventors: Lalit R. Bahl, Amawalk; Peter V. DeSouza; Robert L. Mercer, both of Yorktown Heights, all of N.Y.

[73] Assignee: International Business Machines Corporation, Armonk, N.Y.

[21] Appl. No.: 696,976

[22] Filed: Jan. 31, 1985

[51] Int. Cl.⁴ .............................................. G10L 5/00
[52] U.S. Cl. ................................................... 381/43
[58] Field of Search ................................. 381/41–47; 364/513.5

[56] References Cited

U.S. PATENT DOCUMENTS 4,099,257 6/1978 Arnold et al. .................... 364/900
4,100,370 7/1978 Suzuki et al. ...................... 381/42

FOREIGN PATENT DOCUMENTS

A2534719 4/1984 France.

OTHER PUBLICATIONS

Language and Speech, vol. 4, No. 4, Oct./Dec. 1961, pp. 200–219; G. E. Peterson: "Automatic Speech Recognition Procedures".

The Bell System Technical Journal, vol. 60, No. 5, May–Jun. 1981, pp. 739–766, American Telephone and Telegraph Co., Murray Hill, NJ, US; L. R. Rabiner et al.: "A Two-Pass Pattern-Recognition Approach to Isolated Word Recognition".

Primary Examiner—Emanuel S. Kemeny
Attorney, Agent, or Firm—Marc A. Block

[57] ABSTRACT

In a speech recognition system, discrimination between similar-sounding uttered words is improved by weighting the probability vector data stored for the Markov model representing the reference word sequence of phones. The weighting vector is derived for each reference word by comparing similar sounding utterances using Viterbi alignment and multivariate analysis which maximizes the differences between correct and incorrect recognition multivariate distributions.

17 Claims, 5 Drawing Sheets

"APPRENTICE"
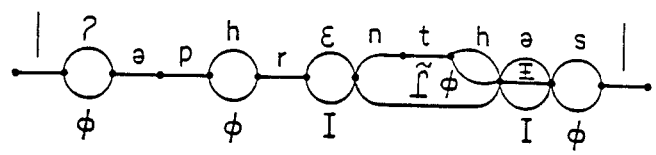
FIG. 1
"CONCERN"
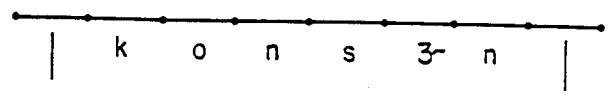
FIG. 2
MARKOV MODEL
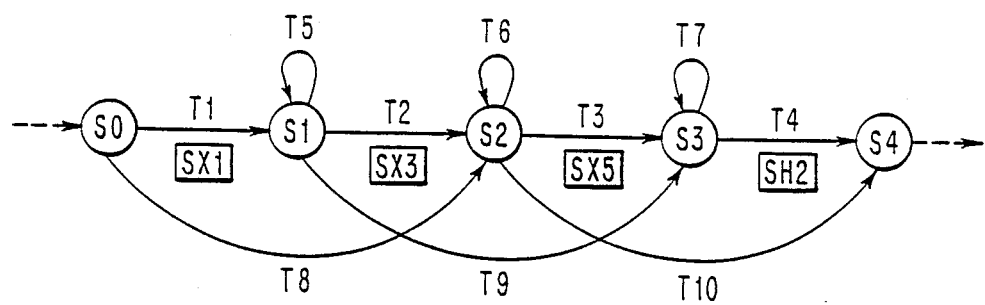

| PHONE | STATE | TRANS-ITION | ARC PROB. | OUTPUT PROBABILITIES L001 L002 ...... L200 | WEIGHT |
|---|---|---|---|---|---|
| PH1 | S10 | T101<br>T102 | 0.75<br>0.25 | 0.03 0.00 ........ 0.13 | W(1) |
| | S11 | T111<br>T112<br>T113 | 0.50<br>0.25<br>0.25 | | |
| | S12 | T121<br>T122<br>T123 | | ---- | |
| | S13 | T131<br>T132 | ---- | | |
| PH2 | S20 | T201<br>T202 | ---- | ---- | W(2) |
| ---- | | | | | ---- |
| PHN | SN0 | TN01<br>TN02 | | | W(N) |
| | SN1 | TN11<br>TN12<br>TN13 | | | |
| | SN2 | TN21<br>TN22 | 0.3<br>0.7 | 0.25 0.12 ........ 0.00 | |
| | | | | | W(φ) |

FIG. 3   STATISTICAL WORD MODEL

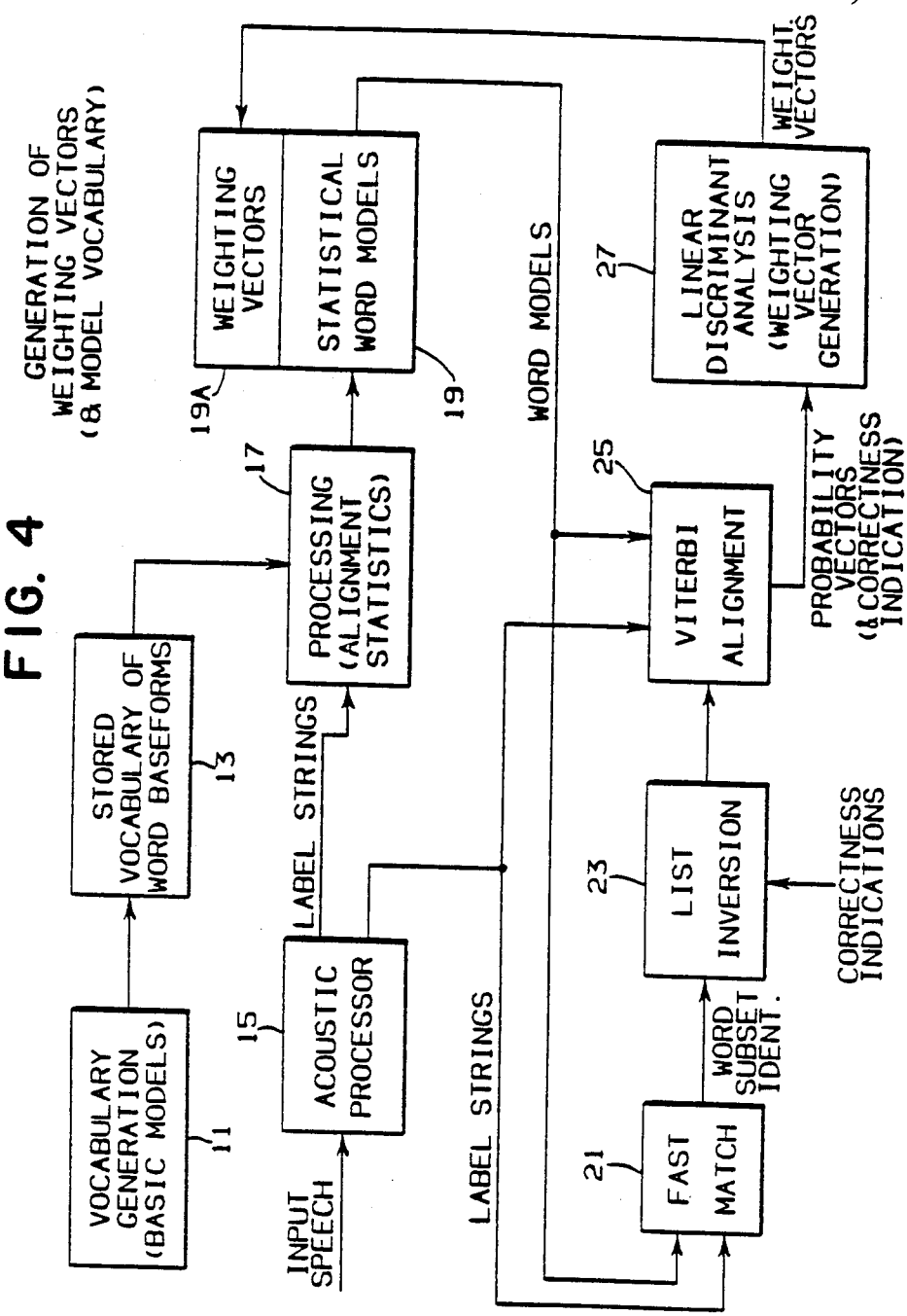

FIG. 5

TRAINING DATA FOR LINEAR
DISCRIMINANT ANALYSIS FOR
WORD MODEL "CONCERN"

| TRAINING UTTERANCES | PROBABILITY VECTORS FOR PHONES | | | | | | −=WRONG +=CORRECT |
|---|---|---|---|---|---|---|---|
| | PH1 | PH2 | PH3 | PH4 | PH5 | PH6 | |
| UT1 CONCERN | p(11) | p(12) | — | — | — | p(16) | + |
| UT2 CONCERNED | p(21) | p(22) | — | — | — | p(26) | − |
| UT3 CONCERNS | — | — | — | — | — | — | − |
| UT4 CONCERN | — | — | — | — | — | — | + |
| UT5 CONCEPT | p(51) | p(52) | — | — | p(56) | | − |
| WEIGHT VECTOR | W(1) | W(2) | W(3) | W(4) | W(5) | W(6) | W(0) THRESHOLD |

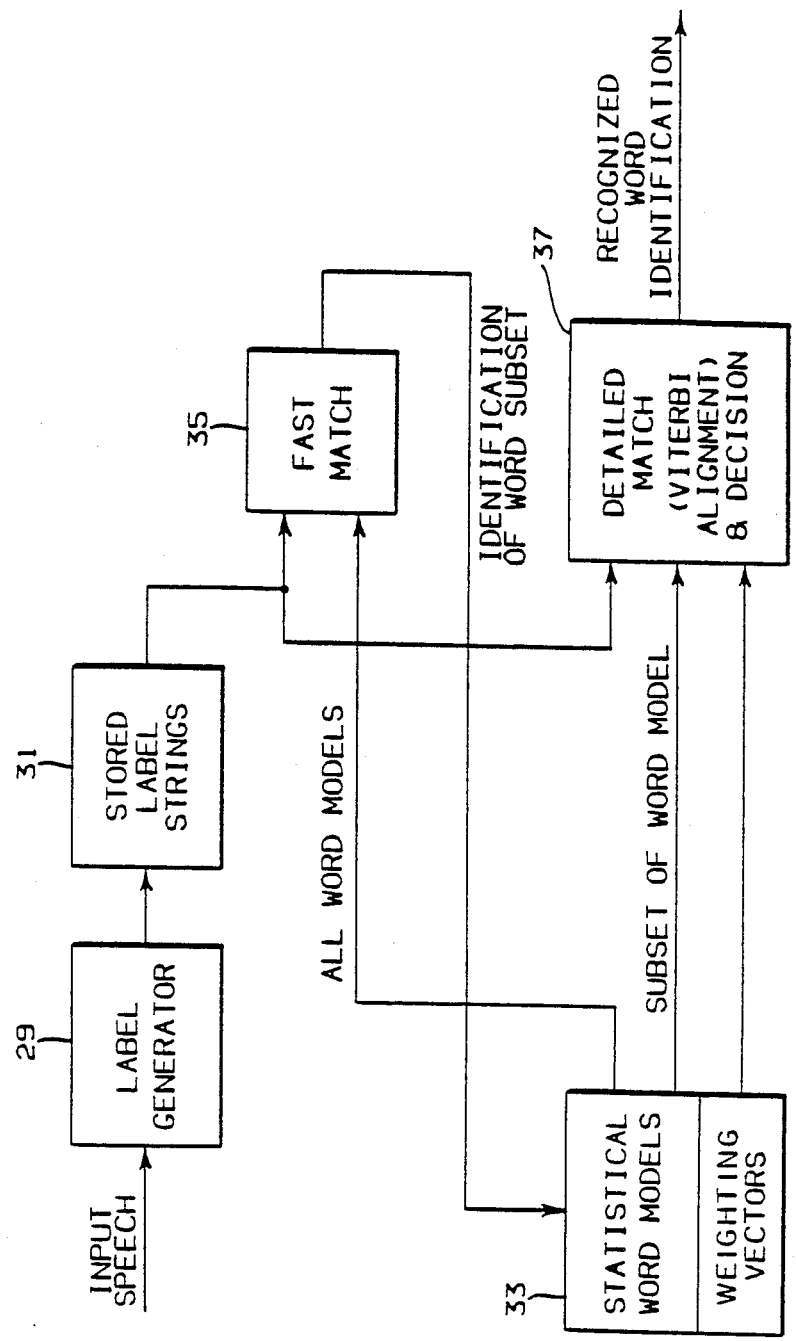

DETERMINATION OF PHONE WEIGHTS FOR MARKOV MODELS IN A SPEECH RECOGNITION SYSTEM

FIELD OF INVENTION

The present invention is related to speech recognition systems using Markov models for representing words, and in particular to the determination and introduction of phone weights for word models to enhance the discrimination capability of a speech recognition system.

BACKGROUND OF INVENTION

In some known approaches to speech recognition, words are represented by phone-based Markov models and input speech which, after conversion to a coded sequence of acoustic elements or labels, is decoded by matching the label sequences to these models, using probabilistic algorithms such as Viterbi decoding.

U.S. Pat. No. 4,099,257 to R. F. Arnold et al entitled, "Markov Processor for Context Encoding from Given Characters and for Character Decoding from Given Contexts", and U.S. Pat. No. 4,348,553 to J. K. Baker et al entitled "Parallel Pattern Verifier with Dynamic Time Warping" are representative of systems in which alignment of received information that is to be decoded or identified is performed with respect to Markov models. Recognition errors in speech recognition systems typically occur between similarly sounding words such as "concern" and "concerned". This is due to the fact that major portions of similar words are identically pronounced and thus do not contribute at all to distinction. Only a minor portion in such similar words is different and thus critical for discrimination. Because in known speech recognition systems using statistical word models all phones in the models are treated equal, the really discriminating portions do not contribute properly to the recognition decision.

OBJECTS OF THE INVENTION

It is an object of the invention to increase, in a speech recognition system based on statistical word models, the capability to correctly distinguish similar words.

It is a further object of the invention to devise a method of generating coefficients associated with word model phones, which improve the discernability of utterances that may cause false recognition selections when only a normal probabilistic decoding algorithm is used.

It is another object of the invention to improve the chances of correctly recognizing an utterance that is closely similar to other utterances representing different words, based on actually known recognition decisions for such similar utterances.

DISCLOSURE OF THE INVENTION

According to the invention, coarse word preselections are made for utterances, and are marked in a training session to indicate whether the selections were correct or wrong. Furthermore, each utterance is matched against each word preselected for it to obtain a probability measure for that combination as in a usual recognition process. Based on this knowledge of the correct or erroneous result of the coarse selection, plus the probability measure of the normal recognition process, a discriminant analysis is made to determine, for the whole population of word models, how each phone in each word model should be weighted so that an optimum discrimination between similar words is achieved. The weighting coefficients thus obtained are stored with the word models and are later used, during actual speech recognition, to weight the probabilistic contribution of each phone for the final word selection.

Thus, the efficiency of the speech recognition system is increased by reducing the number of wrong word selections. This is possible because the weighting coefficients are based on a training step in which selections from wrong similar words are intentionally provoked and a determination is made as to whether the selection is correct or incorrect.

These and other advantages of the invention will become more evident from a description of a preferred embodiment which is disclosed in the following with reference to the drawings.

BRIEF DESCRIPTION OF THE DRAWINGS

FIG. 1 is an illustration of phonetic baseforms for two words;

FIG. 2 is a schematic representation of a Markov model for a phone;

FIG. 3 shows a partial sample of a table representing a statistical Markov model trained by numerous utterances;

FIG. 4 is a block representation of the procedure for generating weighting vectors that are applied to statistical word models;

FIG. 5 is a representative table showing schematically, for a sample word, probability vectors and the weighting vector obtained in a training phase; and FIG. 6 is a block diagram of the speech recognition procedure using weighting coefficients in accordance with the invention;

DETAILED DESCRIPTION

(A) General Overview and Background (1) Labeling of Speech Input Signal

A preliminary function of this speech recognition system is the conversion of the speech input signal into a coded representation. This is done in a procedure that was described for example in "Continuous Speech Recognition with Automatically Selected Acoustic Prototypes Obtained by either Bootstrapping or Clustering" by A. Nadas et al, Proceedings ICASSP 1981, pp. 1153–1155.

In accordance with the Nadas et al conversion procedure, speech input is divided into centisecond intervals. For each centisecond interval, a spectral analysis of the speech input is made. A determination is then made as to which of a plurality of predefined spectral patterns the centisecond of speech input most closely corresponds. A "feneme" that indicates which spectral pattern most closely conforms to the speech input is then assigned to the particular centisecond interval. Each feneme, in turn, is represented as a distinct label. A string of labels (or fenemes) thereby represents successive centiseconds of speech which, in turn, form words.

A typical finite set of labels is shown in Table 1 which is appended to this specification. It comprises about 200 labels each of which represents an acoustic element. It should be noted that these acoustic elements are shorter than the usual "phonemes" which roughly represent vowels or consonants of the alphabet, i.e., each phoneme would correspond to a sequence of labeled acoustic elements.

An important feature of this labeling technique is that it can be done automatically on the basis of the acoustic signal and thus needs no phonetic interpretation. The unit which does the conversion from the acoustic input signal to a coded representation in the form of a label string is called an "acoustic processor".

(2) Statistical Model Representation of Words

The basic functions of a speech recognition system in which the present invention can be used will be described here briefly though several publications are also available which give more details of such a system, in particular F. Jelinek, "Continuous Speech Recognition by Statistical Methods", Proceedings IEEE, Vol. 64, 1976, pp. 532-576.

In the system, each word of the recognition vocabulary is represented by a baseform wherein the word is divided for recognition purposes into a structure of phones, i.e. phonetic elements as shown in FIG. 1. These phones correspond generally to the sounds of vowels and consonants as are commonly used in phonetic alphabets. In actual speech, a portion of a word may have different pronunciations as is indicated by the parallel branches in FIG. 1. The parallel branches which extend between nodes through which all such branches pass may alternatively be considered together as a "clink" or as separate conventional phones. The clink, as the principles of this invention apply, may be viewed as a substitute phonetic element for the phones discussed hereinbelow.

The phones in turn, are represented by Markov models. Referring now to FIG. 2 a sample Markov model for a phone is illustrated. For each phone there is a corresponding Markov model characterized by (a) a plurality of states (S0...S4), (b) transitions (T1...T10) between the states, and (c) label probabilities, each representing the likelihood that the phone will produce a particular label at a given transition. In one embodiment each transition in the Markov model has two hundred stored label probabilities associated therewith, each probability representing the likelihood that each respective label (of a set of 200 labels) is produced by the phone at a given transition. Different phones are distinguished in their respective Markov models by differences in the label probabilities associated with the various transitions. The number of states and transitions therebetween may differ but, preferably, these factors remain the same and the stored label probabilities vary.

In the Markov model of FIG. 2, a string of labels SX1-SX3-SX5-SH2 (taken from Table 2) has entered the phone model in the order shown. The probability of each label occurring at the transition at which it is shown (e.g. SX1 at transition T1) is determined based on the corresponding stored label probability. Phone models having the highest label probabilities for the labels in the string are the most likely phones to have produced the string.

While the labels in FIG. 2 suggest continuity from label to label along transition to transition—which enables a simple one-to-one alignment between string label and transition—the Markov model of FIG. 2 also permits other alignment as well. That is, the Markov model of FIG. 2 can determine that a phone is likely even where more labels, less labels, or even different labels are applied to the phone model. In this regard, besides transitions from one state to another, there are also transitions (T5, T6, T7) that go back to the same state that was just left. Furthermore, there are transitions (T8, T9, T10) that skip a neighbor state. The Markov model thereby provides that different pronunciations of a phone can be accommodated in the same basic Markov model. If, for example, a sound is stretched (slow speaker) so that the same acoustic element appears several times instead of only once as usual, the Markov model representation allows several transitions back to the same state thus accommodating the several appearances of the acoustic element. If, however, an acoustic element that usually belongs to a phone does not appear at all in a particular pronunciation, the respective transition of the model can be skipped.

Any possible path (Markov chain) from the initial state to the final state of the Markov model (including multiple occurrences of the turnback transitions, T5, T6 or T7) represents one utterance of the word (or phone), one acoustic element or label being associated with each transition.

In the present invention, label strings are "aligned" to Markov models by associating labels in the string with transitions in a path through the model; determining probabilities of each label being at the associated transition, on the basis of stored label probabilities set by previous experiences or training (as explained below). A chain of Markov models having the highest probability identifies the word that is to be selected as output.

The baseforms of the words and the basic Markov models of phones can be derived and defined in different ways, as described in the cited literature. Model generation may be done by a linguist, or the models can be derived automatically using statistical methods. As the preparation of the models is not part of the invention, it will not be described in more detail.

It should be mentioned that instead of representing words first by a sequence of Markov phone models, they could also be directly represented by Markov word models—as by a sequence of states and transitions that represent the basic string of acoustic elements for the whole word.

After structuring of the basic models that represent the words in a vocabulary, the models must be trained in order to furnish them with the statistics (e.g. label probabilities) for actual pronunciations or utterances of all the words in the vocabulary. For this purpose, each word is spoken several times, and the label string that is obtained for each utterance is "aligned" to the respective word model, i.e. it is determined how the respective label string can be obtained by stepping through the model, and count values are accumulated for the respective transitions. A statistical Markov model is formulated for each phone and thus for each word as a combination of phones. From the Markov model it can be determined with what probability each of various different label strings were caused by utterance of a given word of the vocabulary. A storage table representing such a statistical Markov model is shown in FIG. 3 and will be explained in more detail in a later section.

For actual speech recognition, the speech signal is converted by the acoustic processor to a label string which is then "matched" against the existing word models. A specific procedure, the Viterbi Algorithm (described briefly in the above mentioned Jelinek paper and in more detail in a paper by G. D. Forney, "The Viterbi Algorithm", Proceedings, IEEE, Vol. 61, 1973, pp. 268-278) is used for this, and the result is a probability vector for each of a number of "close" words which may have caused the given label sequence. Then the actual output, i.e. the identification of a word that is selected as the recognition output, is determined by selecting the word whose probability is found to have the highest generated probability vectors.

(3) Principle Operation of the Invention

The decisions made in the final step of the recognition process can of course be wrong. The possibility of making erroneous selections is increased in situations where two or more words are very similar and have only one or a few elements by which they actually can be distinguished. The invention suggests how to give more emphasis to those elements (or phones) which reflect the distinction between similar words, and to give less emphasis to those elements which are not capable of enhancing the distinction.

Briefly stated, the invention introduces a weighting function for the phones of the words in the given vocabulary, and uses the weighting coefficients during the final step of the recognition process for improving discernability. The function of the invention may best be illustrated by giving a formula for the probability vectors that are generated in the final step of the recognition process.

Without the present invention, the logarithm of the probability that utterance of a particular word is the cause for an observed label string is given by the term $$S(\text{Word}) = \log \prod_{i=1}^{N} p(i) = \sum_{i=1}^{N} \log p(i)$$

where N denotes the number of phones in the word model, and p(i) denotes the probability associated with the i-th phone along the Viterbi path.

In accordance with the present invention, the probability will now be given by the term $$S(\text{Word}) = w(0) + \sum_{i=1}^{N} w(i) * \log p(i)$$

where w(i) is the weighting coefficient associated with the i-th phone of the respective word model and w(0) is a threshold value.

As can be seen, this invention provides for the assigning of individual weight contributions to each phone of the word models and thus improves the distinguishability of similar words. As a result, the speech recognition will have a decreased error rate.

Details of the invention, concerning generation of the weighting coefficients and their use during the recognition process are described in the next section.

(B) Specific Embodiment of Invention (1) Statistical Model and Weighting Coefficient With reference to FIG. 4, generation of the statistical word models in a speech recognition vocabulary and, in particular, the inclusion of the additional weighting coefficients according to present invention will now be described.

Vocabulary generation element 11 functions to generate a vocabulary of word models, i.e. the phone representation and basic Markov models for all of the words that are to be recognized. This procedure is described in the literature, e.g. in the Jelinek paper already mentioned, and in an article by J. M. Lucassen and R. L. Mercer, "An Information Theoretic Approach to the Automatic Determination of Phonemic Baseforms", Proceedings ICASSP 1984, pp. 42.5.1–42.5.4., and therefore no details need be given here. One sample baseform of sequential phones is shown in FIG. 1, and a portion of a basic Markov model is illustrated in FIG. 2. The phone-based Markov models of all words in the vocabulary are registered in storage, as indicated by storage element 13 in FIG. 4. The phone string models of the words are stored as a list wherein each of the words (a) is identified by a code designation or by the proper spelling of the respective word, and (b) has a set of phone identifiers associated therewith. There may be as many as 5,000 word models or more in a vocabulary, using about 50 different phones. The length of word models is of course variable as different words may consist of differing number of phones.

The basic Markov model of a phone consisting of a number of states interconnected by transition arcs, can each be represented in storage as a structure which is available in any of several programming languages (e.g. in PL/1).

As noted above, the basic models must be trained or "filled" with statistics to enable actual speech recognition (first training phase). For this purpose, each word in the vocabulary is read several times and converted by an acoustic processor 15 to a string of labels (acoustic elements of a given finite set, each representing preferably 10 milliseconds of speech). Each such label string—which represents one utterance—is then aligned to a respective word model, i.e., to the Markov model forming a baseform that represents a whole word. This alignment is performed by the well-known Viterbi or maximum likelihood decoding procedure. Statistical values are then collected on the basis of the aligned label strings, to indicate how often a respective feneme (label) occurs on a given transition between two states. From these statistical values, a probability distribution is derived which indicates, for each word model, what the probability is that a specific transition is taken when leaving a given state. Also indicated is the probability that if the respective transition is taken, a respective one of the preferably 200 fenemes is generated as an output with that transition. The whole process of alignment and statistics generation is represented by processor 17 in FIG. 4.

The statistical values thus obtained are kept in a storage element 19 of FIG. 4. A representative portion of such a statistical distribution table for a given Markov model of a word is shown in FIG. 3. For each phone of a word model there is one segment in the table which in turn is subdivided into sections each representing one state of the Markov model of the respective phone. For each state in turn, there are listed all possible transitions. Each transition is represented by a vector whose elements are (a) the probability that the respective transition or arc is actually taken as output from the state it belongs to, and (b) the probabilities for the 200 labels L001 . . . L200 that they occur as output when this path is taken.

This generation of the statistical Markov models (or probability distribution tables) is known from the literature as was mentioned already and is not part of the present invention. In principle, speech recognition is possible on the basis of this information but the invention which improves the recognition results needs additional preparatory steps for generating the required weighting coefficients. These steps will now be explained with reference to the remaining portions of FIG. 4.

For generating the weighting coefficients, all the words of the desired vocabulary are read and each utterance of a word is converted in the acoustic processor (15) to a label string. Each label string is matched to all statistical word models existing in the vocabulary (19) in a so-called "fast match" procedure (represented by fast match element 21 in FIG. 4) to obtain within a relatively short time interval for each utterance a list of candidate words which have a relatively high probability of being the word that caused the respective utterance. This fast match procedure reduces the number of candidates for detailed matching from the total vocabulary of about 5,000 words to a small group of words whose number is on the order of ten to one hundred. A sample result of a fast match operation based on the utterance of the word "I" as shown in Table 2 is appended to this specification. As can be seen, thirty candidates were selected (including the correct selection "I") which all have at least a portion that sounds similar to the pronunciation of "I". Details for the fast match are disclosed in a co-pending patent application entitled "Apparatus and Method for Performing Acoustic Matching" by L. R. Bahl, R. L. Mercer, and S. V. DeGennaro.

In brief, the fast match relates to a procedure for statistically determining at least one word in a vocabulary of words having a relatively high probability of having generated a string of incoming labels produced in response to a speech input by characterizing each word as a sequence of phonetic elements (including conventional phones or clinks), wherein the statistical representations of the phonetic elements are simplified by approximations. According to a first approximation, the actual probabilities that a given phonetic element generates a given label at any of various state transitions in the given phonetic elements are replaced by a single specific value which is, preferably, no less than the maximum actual probability for the given label in the given phonetic element. A second approximation provides that the probability of a given phonetic element generating any length of labels between a minimum length of labels and a maximum length of labels is uniform. A match value for a particular phonetic element corresponds to a sum of end time probability terms, each of which is the sum of probabilities that the particular phonetic element generates any of successively increasing lengths of labels. A third approximation provides that only a maximum number of labels be examined in forming a match value for any phonetic element and that, preferably, the number of end time probabilities considered in determining a match value be equal to the maximum number of labels plus the largest number of states of any phonetic element. Word match scores are computed by log summing match values for successive component phonetic elements and words with the highest match scores are ordered in a list of candidate words, each of which can then be matched by a detailed match without aproximation and/or by a language model match. In addition, the vocabulary words are matched according to a tree structure so that the beginning portions of a plurality of words are matched simultaneously for so long as the words have similar phonetic beginnings.

The result of the fast match operation for all utterances of all words is a number of word vocabulary subsets like that shown in Table 2, one for each utterance. Based on the knowledge of which word was actually spoken during training, the word selections of the fast match can then be determined as being correct or erroneous, and a respective indication is attached to and retained with each selected candidate word identification. In a further step indicated by list inversion element 23 in FIG. 4, these lists are now "inverted" to generate for each word model of the vocabulary a list of utterances that caused the respective word to be selected as a candidate in the fast match procedure. A sample for such an inverted list is shown in Table 3. It contains also the indications for which of the utterances the fast match (coarse selection) was correct, and for which it was incorrect.

In a next step indicated in FIG. 4 by element 25, a Viterbi alignment procedure is done for the label string of each utterance identified in the inverted list of a word, against the statistical model of the respective word as contained in storage. This is the operation that is also done in normal speech recognition for any utterance that is to be recognized, to find out its probability of being related to, or caused by, the speaking of a specific word. The Viterbi alignment procedure need not be explained here because it was described already in the literature, as mentioned above.

The result of the Viterbi alignment step is a number of probability vectors for each word, each of the vectors being related to one of the training utterances, and each having an indication whether the respective fast match selection was correct or not. Individual components of these probability vectors are each associated to one phone of the respective word model, and give the probability that a specific portion (or feneme subgroup) of the utterance involved represents the respective phone. FIG. 5 shows a sample of the list of probability vectors for one word model which was selected as a candidate in the fast match for five similar utterances. The probability vectors have the same number of components as the number of phones in the respective word model. In addition, an indication is given for each such probability vector whether the respective fast match selection was wrong or correct. As shown in the example, for the utterances UT1 and UT4 which actually were caused by speaking the word "concern", the word model "concern" was correctly selected as a candidate. For the utterances UT2, UT3, and UT5 (caused by speaking the similar words "concerned", "concerns", and "concert", respectively), the preselection by the fast match was an erroneous selection.

On the basis of these training data (probabilities and correctness indications) that were obtained during the extra training phase, it is now possible to assign weighting coefficients for achieving a better discrimination between similar words (see discriminant analysis element 27 in FIG. 4). For generation of the weighting coefficients, a "linear discriminant analysis" is made which determines, on the basis of test data obtained from samples of different classes from a population, including indications to which class each sample actually belongs, how the different parameters used for determining the association of a sample to a class, should be weighted to achieve the best possible discrimination. A description of a mathematical procedure which may be applied is given in the book "The Advanced Theory of Statistics, Vol. 3" by M. Kendall et al, 4th Edition, McMillan, New York, 1983, pp. 370–377.

The specific discriminant analysis procedure used in the present embodiment of the invention is described hereafter which shows a flow diagram of this procedure for obtaining the weighting coefficients.

Let $\overline{X}_c$ and $\overline{X}_w$ denote the mean "correct" and "wrong" phone probability vectors respectively for a selected word. Let $\underline{S}_c$ and $\underline{S}_w$ denote the sample covariance matrices of the correct and wrong vectors respectively, and define $\underline{S}$ to be the pooled unbiased estimator of the covariance matrix:

$$S = \frac{n_c S_c + n_w S_w}{n_c + n_w - 2}$$

where $n_c$ and $n_w$ denote the number of correct and wrong probability vectors respectively. The vector of phone weights $\underline{W}$ is computed as $$\underline{W} = \underline{S}^{-1}(\overline{X}_c - \overline{X}_w)$$

and the threshold $w_o$ as $$w_o = \tfrac{1}{2}\underline{w}'(\overline{X}_c + \overline{X}_w)$$

As a result, for each word model a weighting vector is obtained whose elements $W(0) \ldots W(N)$ are the weighting coefficients to be used for the individual phones of the respective word model. Thus, the number of weighting coefficients is equal to the number of phones in a word model. In addition to the weighting coefficients, each weighting vector also contains a threshold value $w(0)$ which must be used in determining whether an utterance represents a word model or not. The threshold value is also obtained during the linear discriminant analysis procedure.

The weighting vectors thus obtained for all words of the vocabulary are stored in storage (19A in FIG. 4) together with the statistical Markov models of all words. The weighting vectors and Markov models are relied on in the actual speech recognition processes (see also FIG. 3).

(2) Speech Recognition Using Weighting Coefficients

The speech recognition procedure using weighting coefficients according to the invention is schematically illustrated in FIG. 6. For the actual speech recognition, the speech is transformed into label strings (29) as was explained earlier. Label strings are intermediately stored (31) to enable a two-step recognition procedure. Each label string is then matched, without using the existing weighting vectors, to all statistical word models (33) of the vocabulary in a fast match procedure (35) that was mentioned in the previous section. The result of the fast match for each utterance is the identification of a subset of words which are the best candidates (coarse selection) for a more detailed matching selection.

In a further step (37), a detailed match is performed for each of the given label strings that were obtained from the current speech, against each of the word models identified in the fast match preselection for the respective utterance. In this detailed matching or Viterbi alignment procedure, probability vectors are obtained which now in this final recognition step are modified by the weighting coefficients. As indicated by the last expression given in section A(3), logarithms of the phone probabilities $p(i)$ obtained in the Viterbi alignment are multiplied by associated phone weight coefficients $w(i)$, and the sum of all weighted phone probability logarithms is then added to the threshold value $w(0)$ for each respective word in the fast match list. The word having the biggest score is taken as the correct word.

Thus, the final output sequence of identifiers for recognized words that is furnished in response to label strings caused by input speech has a higher chance of being correct due to the increased discrimination capability between similar words, that was given to the speech recognition system by present invention.

In addition to the variations and modifications to applicant's disclosed apparatus which have been suggested, many other variations and modifications will be apparent to those skilled in the art, and accordingly, the scope of applicant's invention is not to be construed to be limited to the particular embodiments shown or suggested.

TABLE 1

THE TWO LETTERS ROUGHLY REPRESENT THE SOUND OF THE ELEMENT.
TWO DIGITS ARE ASSOCIATED WITH VOWELS:
    FIRST: STRESS OF SOUND
    SECOND: CURRENT IDENTIFICATION NUMBER
ONE DIGIT ONLY IS ASSOCIATED WITH CONSONANTS:
SINGLE DIGIT: CURRENT IDENTIFICATION NUMBER

| | | | | |
|---|---|---|---|---|
| 001 AA11 | 029 BX2- | 057 EH02 | 148 TX5- | 176 XX11 |
| 002 AA12 | 030 BX3- | 058 EH11 | 149 TX6- | 177 XX12 |
| 003 AA13 | 031 BX4- | 059 EH12 | 150 UH01 | 178 XX13 |
| 004 AA14 | 032 BX5- | 060 EH13 | 151 UH02 | 179 XX14 |
| 005 AA15 | 033 BX6- | 061 EH14 | 152 UH11 | 180 XX15 |
| 006 AE11 | 034 BX7- | 062 EH15 | 153 UH12 | 181 XX16 |
| 007 AE12 | 035 BX8- | 126 RX1- | 154 UH13 | 182 XX17 |
| 008 AE13 | 036 BX9- | 127 SH1- | 155 UH14 | 183 XX18 |
| 009 AE14 | 037 DH1- | 128 SH2- | 156 UU11 | 184 XX19 |
| 010 AE15 | 038 DH2- | 129 SX1- | 157 UU12 | 185 XX2- |
| 011 AW11 | 039 DQ1- | 130 SX2- | 158 UXG1 | 186 XX20 |
| 012 AW12 | 040 DQ2- | 131 SX3- | 159 UXG2 | 187 XX21 |
| 013 AW13 | 041 DQ3- | 132 SX4- | 160 UX11 | 188 XX22 |
| 014 AX11 | 042 DQ4- | 133 SX5- | 161 UX12 | 189 XX23 |
| 015 AX12 | 043 DX1- | 134 SX6- | 162 UX13 | 190 XX24 |
| 016 AX13 | 044 DX2- | 135 SX7- | 163 VX1- | 191 XX3- |
| 017 AX14 | 045 EE01 | 136 TH1- | 164 VX2- | 192 XX4- |
| 018 AX15 | 046 EE02 | 137 TH2- | 165 VX3- | 193 XX5- |
| 019 AX16 | 047 EE11 | 138 TH3- | 166 VX4- | 194 XX6- |
| 020 AX17 | 048 EE12 | 139 TH4- | 167 WX1- | 195 XX7- |
| 021 BQ1- | 049 EE13 | 140 TH5- | 168 WX2- | 196 XX8- |
| 022 BQ2- | 050 EE14 | 141 TQ1- | 169 WX3- | 197 XX9- |
| 023 BQ3- | 051 EE15 | 142 TQ2- | 170 WX4- | 198 ZX1- |
| 024 BQ4- | 052 EE16 | 143 TX3- | 171 WX5- | 199 ZX2- |
| 025 BX1- | 053 EE17 | 144 TX1- | 172 WX6- | 200 ZX3- |
| 026 BX10 | 054 EE18 | 145 TX2- | 173 WX7- | |
| 027 BX11 | 055 EE19 | 146 TX3- | 174 XX1- | |
| 028 BX12 | 056 EH01 | 147 TX4- | 175 XX10 | |

TABLE 2

FAST MATCH RESULT FOR AN UTTERANCE OF THE WORD "I" (SELECTION FROM A VOCABULARY OF CA. 5000 WORDS)

| | | | |
|---|---|---|---|
| 1 | I | 16 | housing |
| 2 | high | 17 | either |
| 3 | highly | 18 | filing |
| 4 | hiring | 19 | finally |
| 5 | by | 20 | I'll |
| 6 | variety | 21 | i.e. |
| 7 | higher | 22 | dining |
| 8 | my | 23 | quite |
| 9 | hire | 24 | I'd |
| 10 | via | 25 | finding |
| 11 | Hyatt | 26 | might |
| 12 | Mike | 27 | like |
| 13 | buying | 28 | trying |
| 14 | type | 29 | defining |
| 15 | however | 30 | why |

TABLE 3

REDUCED TRAINING SAMPLE FOR 6 WORDS
(WD) AND 9 UTTERANCES (UT)

FAST MATCH RESULT

|     | WD1 | WD2 | WD3 | WD4 | WD5 | WD6 |
| --- | --- | --- | --- | --- | --- | --- |
| UT1 | 0   | +   | −   | −   | 0   | 0   |
| UT2 | +   | −   | −   | 0   | 0   | 0   |
| UT3 | 0   | +   | 0   | −   | −   | 0   |
| UT4 | 0   | 0   | 0   | +   | 0   | 0   |
| UT5 | 0   | 0   | 0   | −   | +   | 0   |
| UT6 | 0   | 0   | −   | +   | 0   | 0   |
| UT7 | 0   | 0   | +   | −   | 0   | 0   |
| UT8 | +   | −   | −   | 0   | 0   | 0   |
| UT9 | 0   | 0   | 0   | 0   | −   | +   |

INVERTED LIST

|      | CORRECT | WRONG |
| ---  | ---     | ---   |
| WD1: | UT2/UT8 | —     |
| WD2: | UT1/UT3 | UT2, UT8 |
| WD3: | UT7     | UT1, UT2, UT6, UT8 |
| WD4: | UT4/UT6 | UT1, UT3, UT5, UT7 |
| WD5: | UT5     | UT3, UT9 |
| WD6: | UT9     | —     |

+ = correctly selected
− = wrongly selected
0 = not selected

We claim:
1. In a speech recognition system having
   (a) a speech processor which converts input word utterances into coded label strings, and
   (b) a stored vocabulary comprising for each word a model comprising
      (i) a plurality of phones representation, and
      (ii) statistical data including label probabilities,
   wherein the probabilities that any label string represents the phones of a given word is indicated by corresponding probability vectors, and in which the label string of each word utterance to be recognized is matched in a Viterbi alignment procedure against word models in the vocabulary, whereby the word having the highest probability for the respective label string is selected as output word,
   a speech recognition method for improving the capability of discriminating between similar utterances corresponding to different words, the method comprising the steps of:
      (a) identifying for each label string of a plurality of utterances, in a fast match procedure, a subset of coarsely matching candidate words and indicating which of these represented the correct word and which not,
      (b) generating for each word an inverted list of label strings for which it was selected in the fast match procedure, and indicating whether the selection was correct or not,
      (c) generating for each word, using the label strings identified in the inverted fast match output list and using the statistical data of the respective word model, a set of probability vectors in a Viterbi alignment procedure, each for one label string and carrying a designation whether the initial fast match selection was correct or wrong,
      (d) generating for each word, from the sets of probability vectors, in a linear discriminant analysis procedure, a weighting vector, and
      (e) weighting, during an actual speech recognition process, the probability vector elements by the associated weighting vector elements.

2. A speech recognition method in accordance with claim 1, characterized in that the linear discriminant analysis procedure of step (d) includes generating a threshold value in association with each weighting vector, and that in an additional step following step (e), the weighted probability vector elements are accumulated and compared against the threshold value for generating a selection criterion.

3. A speech recognition method in accordance with claim 2, characterized in that in each matching procedure matching an utterance against a word model, a score value is obtained according to the equation:

$$S(\text{Word}) = w(0) + \sum_{i=1}^{N} w(i) * \log p(i)$$

wherein $w(0)$ is the threshold value for the respective word model, $w(i)$ are the elements of the weighting vector, $p(i)$ are the phone probabilities obtained in the matching procedure, and $N$ is the number of phones of the respective word model.

4. A method for speech recognition using a stored vocabulary of statistical word models, each word model comprising a plurality of elements, in which method each utterance is converted to a coded form and each coded utterance is matched against at least a subset of the word models for generating one probability vector per each utterance and word model, and in which method a final output word is selected for each utterance on the basis of the respective probability vectors, characterized by the following additional steps for improving the discrimination capability of the recognition method:
   in a preliminary training operation:
      (a) producing at least one coded utterance for each word, and matching each such coded utterance against all word models to obtain a subset of candidate words for the respective utterance,
      (b) performing a fine match for each utterance against each candidate word model obtained in step (a), and generating a probability vector for the candidate word with respect to the utterance,
      (c) generating for each probability vector an indication whether the utterance was actually representing the word or not,
      (d) collecting for each word model all generated probability vectors and correctness indications,
      (e) generating, in a discriminant analysis procedure involving all generated probability vectors and correctness indications, a weighting vector for each word model, and
      (f) storing said weighting vectors for all word models;
      in each actual speech recognition process: using said weighting vector of each word model to modify each probability vector that was generated by matching a coded utterance against the respective word model.

5. A speech recognition method in accordance with claim 4, characterized in that the number of elements in each generated probability vector and in each weighting vector is equal to the number of elements of the respective word model.

6. A speech recognition method in accordance with claim 5, characterized in that in the discriminant analysis procedure of step (e), also a weighting threshold value is generated for each word model, and that in each actual speech recognition process, a decision value is generated according to the equation:

$$S(\text{Word}) = w(0) + \sum_{i=1}^{N} w(i) * \log p(i)$$

wherein $w(0)$ is the weighting threshold value for the respective word model, $w(i)$ are the elements of the weighting vector, $p(i)$ are the elements of the probability vector, and N is the number of elements in the word model.

7. A method for improving the recognition capability of a speech recognition system in which utterances in coded form are matched against stored word models to generate probability values for selecting the word having the highest probability score as output for each utterance,
characterized in that in a preliminary training operation, a coarse selection of similar candidate words is made for training utterances, that each training utterance is aligned to the respective candidate word models to generate probability values, and that the generated probability values for all pairs of a candidate word and an associated training utterance, plus an indication for each pair whether it is a correct or incorrect combination, are analyzed in a processing step to generate a set of weighting coefficients for each word model.

8. A method in accordance with claim 7, characterized in that in the analyzing processing step, a linear discriminant analysis is performed.

9. A method in accordance with claim 7, for a speech recognition system wherein each word model represents a plurality of phones and each alignment of an utterance to a word model produces a probability value for each phone,
characterized in that the number of weighting coefficients generated for each word model is equal to the respective number of phones, and that in an actual speech recognition process, each phone probability value is weighted by the associated weighting coefficient of the respective word model.

10. A method of improving discrimination between similar words in a vocabulary in a speech recognition system, the method comprising the steps of:
collecting all words which, when uttered, have been characterized as candidates for a given word;
indicating when an uttered word is correctly or wrongly identified as to the given word;
forming for each uttered word a respective probability vector, each component of each respective probability vector being associated with a corresponding phone in the given word; and
determining for each component a measure indicative of the variation between
(a) each component of the probability vector for a correctly recognized uttered word, and
(b) the corresponding component of the probability vectors of the wrongly recognized uttered word.

11. A method according to claim 10 comprising the further step of:
assigning a weight to each phone in the given word based on the measure of variation in the probability vector component corresponding thereto.

12. A method according to claim 11 wherein the forming step includes the step of:
performing a Viterbi alignment of each uttered word against a Markov model of the given word.

13. A method according to claim 12 wherein the measure determining step includes:
forming a first multivariate distribution for the probability vectors for correctly recognized uttered words;
forming a second multivariate distribution for the probability vectors of wrongly recognized uttered words; and
determining the linear function which maximizes the differences between the first and second multivariate distributions.

14. A method according to claim 13 wherein each word in the vocabulary is processed as the given word, each word in the vocabulary thereby being assigned a weight for each phone thereof.

15. A method according to claim 14 comprising the further step of:
applying to each phone along a path in a Viterbi decoder the weight assigned thereto; and
performing word recognition in the Viterbi decoder which has the phones along the path thereof weighted.

16. A method according to claim 15 wherein the collecting step includes the step of:
performing an approximate acoustic match to provide a list of candidate words which have relatively high probability of corresponding to a particular spoken word input.

17. A method according to claim 10 wherein the collecting step includes the step of:
performing an approximate acoustic match to provide a list of candidate words which have relatively high probability of corresponding to a particular spoken word input.

* * * * *